US008876521B2

(12) United States Patent
Heald et al.

(10) Patent No.: US 8,876,521 B2
(45) Date of Patent: Nov. 4, 2014

(54) METHOD AND APPARATUS FOR MAKING CENTRE-FILLED SHAPED FOOD PRODUCTS

(75) Inventors: Victor Heald, York (GB); Satinder Pal Singh, York (GB); Jonathan Taylor, Stillington Yorkshire (GB)

(73) Assignee: Nestec S.A., Vevey (CH)

( * ) Notice: Subject to any disclaimer, the term of this patent is extended or adjusted under 35 U.S.C. 154(b) by 638 days.

(21) Appl. No.: 12/524,881

(22) PCT Filed: Jan. 31, 2008

(86) PCT No.: PCT/EP2008/051163
§ 371 (c)(1),
(2), (4) Date: Feb. 15, 2010

(87) PCT Pub. No.: WO2008/092918
PCT Pub. Date: Aug. 7, 2008

(65) Prior Publication Data
US 2010/0136180 A1    Jun. 3, 2010

(30) Foreign Application Priority Data
Feb. 1, 2007  (EP) .................................... 07101585

(51) Int. Cl.
*A23G 3/54*   (2006.01)
*A23G 1/21*   (2006.01)
*A23G 3/20*   (2006.01)
*A23G 3/02*   (2006.01)
*A23G 1/54*   (2006.01)
*A23L 1/00*   (2006.01)
*A23G 3/34*   (2006.01)

(52) U.S. Cl.
CPC .. *A23G 1/54* (2013.01); *A23G 1/21* (2013.01); *A23G 3/2061* (2013.01); *A23G 3/0263* (2013.01); *A23L 1/0067* (2013.01); *A23L 1/0073* (2013.01); *A23G 3/008* (2013.01)
USPC ........ 425/355; 425/344; 425/345; 425/348 R; 425/350; 425/351; 425/352; 425/353; 425/359; 425/361; 425/407

(58) Field of Classification Search
USPC ................. 425/344, 345, 353, 355, 346, 347, 425/348 R, 350, 351, 352, 54, 360, 362, 425/407, 354, 359, 361; 426/512
See application file for complete search history.

(56) References Cited

U.S. PATENT DOCUMENTS 3,096,248 A * 7/1963 Rudzki .......................... 264/112
3,533,360 A * 10/1970 Kibbe ............................ 425/216
(Continued)

FOREIGN PATENT DOCUMENTS

BE    1005689    12/1993
CH     398285     8/1965
(Continued)

OTHER PUBLICATIONS

International Search Report for International Application No. PCT/EP2008/051163 mailed on May 6, 2008.

(Continued)

*Primary Examiner* — Seyed Masoud Malekzadeh
(74) *Attorney, Agent, or Firm* — K&L Gates LLP

(57) ABSTRACT

The present invention relates to an apparatus for making a food product (2), said product having a solid outer shell (3) with top (4), bottom (5) and side (6) walls, and optionally an inner core (7) filled with liquid, semi-solid and/or solid filling, characterized in that said apparatus comprises: (i) a support frame (8) holding at least one matrix (9) that goes through said support frame (8) and has opposed openings, (ii) two punches (11*a*, 11*b*) disposed respectively each side of said matrix (9) and facing said openings, said punches having a cross section that corresponds to the cross section of said openings, and being movable along a common axis that corresponds to the longitudinal axis of said matrix, said matrix and said pair of punches defining respectively the side and the end walls of a mold (12), (iii) filling means for filling the mold (12), with a predetermined quantity of food product in a liquid or semi-solid form, (iv) actuating means for moving said punches (11*a*, 11*b*) and exerting a longitudinal pressure onto said punches when said mold (12), is filled with food product and closed so that said product contained into said mold is compressed, (v) ejecting means for ejecting a molded food product (2), out of the mold (12), once the latter is in the open position.

8 Claims, 8 Drawing Sheets

(56) References Cited

U.S. PATENT DOCUMENTS

| | | | |
|---|---|---|---|
| 3,566,806 A * | 3/1971 | Forster et al. | 425/345 |
| 3,571,854 A * | 3/1971 | Lundstrom | 425/77 |
| 3,797,986 A * | 3/1974 | Onder | 425/352 |
| 3,923,440 A * | 12/1975 | Bettonica | 425/167 |
| 4,168,137 A * | 9/1979 | McLain et al. | 425/405.2 |
| 4,259,049 A * | 3/1981 | Willich | 425/73 |
| 4,281,593 A | 8/1981 | Gevaert | |
| 4,403,935 A * | 9/1983 | Crossley et al. | 425/210 |
| 4,408,975 A * | 10/1983 | Hack | 425/231 |
| 4,573,895 A * | 3/1986 | DeSantis et al. | 425/78 |
| 4,631,015 A * | 12/1986 | Shigeo et al. | 425/195 |
| 4,999,151 A * | 3/1991 | Hinzpeter | 264/40.4 |
| 5,071,607 A * | 12/1991 | Ayer et al. | 264/112 |
| 5,088,915 A * | 2/1992 | Korsch et al. | 425/345 |
| 5,672,313 A * | 9/1997 | Shiga et al. | 264/460 |
| 5,843,488 A * | 12/1998 | Korsch et al. | 425/193 |
| 5,928,590 A * | 7/1999 | Fabbri | 264/120 |
| 6,004,120 A * | 12/1999 | Matsubara et al. | 425/78 |
| 6,050,798 A * | 4/2000 | Konig | 425/3 |
| 6,068,465 A * | 5/2000 | Wilson | 425/193 |
| 6,106,267 A * | 8/2000 | Aylward | 425/352 |
| 6,167,802 B1* | 1/2001 | Anzawa | 100/35 |
| 6,767,200 B2* | 7/2004 | Sowden et al. | 425/345 |
| 6,787,082 B1* | 9/2004 | Fukuyama et al. | 264/109 |
| 6,830,442 B2* | 12/2004 | Cecil | 425/107 |
| 6,837,696 B2* | 1/2005 | Sowden et al. | 425/112 |
| 6,866,493 B2* | 3/2005 | Trebbi et al. | 425/107 |
| 7,323,129 B2* | 1/2008 | Sowden et al. | 264/101 |
| 7,378,116 B2* | 5/2008 | Bunkers et al. | 426/3 |
| 7,462,023 B2* | 12/2008 | Harada et al. | 425/107 |
| 7,553,147 B2* | 6/2009 | Kramer | 425/193 |
| 2002/0090412 A1* | 7/2002 | Kitamura et al. | 425/259 |
| 2002/0176918 A1 | 11/2002 | Willcocks et al. | |
| 2003/0031744 A1* | 2/2003 | Cecil | 425/107 |
| 2003/0054063 A1* | 3/2003 | Trebbi et al. | 425/261 |
| 2003/0072799 A1* | 4/2003 | Sowden et al. | 424/464 |
| 2004/0113319 A1* | 6/2004 | Kondo et al. | 264/319 |
| 2004/0131717 A1* | 7/2004 | Shimada et al. | 425/345 |
| 2004/0247728 A1* | 12/2004 | Ozeki | 425/354 |
| 2005/0008730 A1* | 1/2005 | Trebbi et al. | 425/261 |
| 2005/0013960 A1* | 1/2005 | Ozeki et al. | 428/43 |
| 2005/0202082 A1* | 9/2005 | Hibino et al. | 424/464 |
| 2005/0266116 A1* | 12/2005 | Teckoe et al. | 425/452 |
| 2006/0147574 A1* | 7/2006 | Harada et al. | 425/345 |
| 2007/0286926 A1* | 12/2007 | Bunkers et al. | 426/4 |

FOREIGN PATENT DOCUMENTS

| | | |
|---|---|---|
| DE | 3447245 | 6/1986 |
| EP | 0494384 | 7/1992 |
| EP | 0776608 | 6/1997 |
| EP | 0827696 | 3/1998 |
| GB | 291278 | 5/1928 |
| GB | 1502194 | 11/1974 |
| WO | WO 01/78519 | 10/2001 |
| WO | WO 02/49447 | 6/2002 |

OTHER PUBLICATIONS

Written Opinion for International Application No. PCT/EP2008/051163 mailed on May 6, 2008.

* cited by examiner

METHOD AND APPARATUS FOR MAKING CENTRE-FILLED SHAPED FOOD PRODUCTS

The present invention relates to a method and apparatus for making centre-filled shaped food products, more particularly a continuous process that is therefore industrially efficient and competitive for making confectionery products.

In a particular—although not meant to be restrictive—embodiment of the invention that will be taken as an example in the following description of the invention, the confectionery product comprises a chocolate shell filled with a semi-solid confectionery product.

The existing industrial equipment for manufacturing centre-filled shaped confectionery products comprises several equipments as described in published patents and patent application hereafter listed. One typical equipment that is used nowadays in the confectionery industry, is a pair of adjacent rolls called Erikson rollers.

Erikson rollers comprise a pair of adjacent rolls which rotate in opposite directions. Complementary recesses are disposed at the surface of the two rolls, such that when the rolls rotate, complementary recesses face each other at the point of tangency of the two rolls so as to form a closed cavity. Filling means are disposed above said point of tangency between the two rolls, so as to fill a cavity that is not completely closed with a liquid or semi-liquid confectionery product such as chocolate. As the rollers rotate, the confectionery product solidifies within the cavity which then opens as the corresponding recesses of each rolls are spaced from each other.

Straight-sided shapes with a logo embossed both on top and bottom can not be formed with Erikson rollers. The reason is the shape would not release from the rolls. Conventional moulding does not allow a logo for instance, to be embossed top and bottom sides of the confectionery product.

The so-called technique of "book-moulding" would permit this, but would leave a visible rim between the two halves of the piece, which is a clear disadvantage in terms of product appearance. Moreover this technique is unsuitable for high volumes of small pieces, i.e. it is not industrially profitable. Also, book moulding would result in a product with a degree of taper corresponding to the draft angle of the mould.

Hereafter is a list of published patents and applications relating to the manufacture of embossed confectionery products.

EP 776 608 A2 is a European patent application (filed by Société des Produits Nestlé on Oct. 11, 1996) that deals with a process for forming an extruded fat-containing confectionery material and discloses that the surface of the cavity may be engraved or embossed with any desired pattern which is to be imparted to the surface of the fat-containing confectionary material.

WO 02/49447 A2 is an International patent application (filed on Dec. 14, 2001 by Société des Produits Nestlé) which discloses a filled confectionery product having a weight less than 3 g comprising a shell-moulded fat-containing confectionery material with a viscous confectionary filling.

WO 01/78519 A1 is an International patent application (filed on Feb. 19, 2001 by Société des Produits Nestlé) which describes a novel confectionery-based product comprising a moulded shell and a substantially planar closure base portion securely sealed onto the edges of the shell.

BE 1 005 689 B1 is a Belgian patent (granted on Dec. 14, 1993 to Sorensen Mairead) that proposes a process and apparatus of manufacture of chocolate-coating confectionery.

EP 494 384 A2 is a European patent application (filed on Dec. 9, 1991 by Meiji Seika Kaisha Ltd.) that concerns a process for the manufacture of chocolate confectionery with fine gas bubbles entrapping a fatty cream base.

DE 344 72 45 A1 is a German patent application (filed by Winkler & Dünnebier, Maschinenfabrik and Eisengiesserei GmbH on Dec. 22, 1984) which relates to a process for producing hollow chocolate articles, preferably with alcoholic filling, chocolate composition for producing a shell being filled into a mould and therein shaken, turned, smoothed off and cooled, and furthermore, after introduction of the filling, the latter being sprayed and cooled, whereupon the shell is closed with a base of chocolate composition.

GB 1502194 (filed on Nov. 9, 1974 by Hans Lesch) is a British patent that deals with a method of introducing solid fillers into confectionery masses and apparatus for performing the method.

In order to solve the above technical problems of current systems, the present invention proposes an apparatus for making a food product, preferably a confectionery product, said product having a solid outer shell with top, bottom and side wall(s), and with or without an inner core filled with liquid, semi-solid and/or solid filling, characterized in that said apparatus comprises:

(i) a support frame holding at least one matrix that goes through said support frame and has opposed openings, (ii) two punches disposed respectively each side of said matrix and facing said openings, said punches having a cross section that corresponds to the cross section of said openings, and being movable along a common axis that corresponds to the longitudinal axis of said matrix, said matrix and said pair of punches defining respectively the side and the end walls of a mould, (iii) filling means for filling the mould with a predetermined quantity of food product in a liquid or semi-solid form, (iv) actuating means for moving said punches and exerting a longitudinal pressure onto said punches when said mould is filled with food product and closed so that said product contained into said mould is compressed, (v) ejecting means for ejecting a moulded food product out of the mould once the latter is in the open position.

In one preferred embodiment of the present invention, the food product is a chocolate product.

Also preferably, the support frame is a horizontal rotary turret with the plurality of moulds disposed at the periphery of said turret, each mould having its punches disposed along a substantially vertical axis.

Advantageously, the filling means comprise by a further, adjacent rotary turret running in time with and above the primary turret. Or the filling devices could move on a path which becomes concentric with the motion of the matrices for a given percentage of one revolution or machine cycle.

Also advantageously, the actuating means comprise:
a drive motor for rotating the support frame in a horizontal plane, and, in the case of rotary execution, a system of a cams controlling the displacement of the punch components.

Furthermore, the present invention is directed towards a food product, preferably a confectionery product, made with an apparatus as previously defined, which comprises a solid outer shell made out of one food product, and an inner core that is solid, semi-solid, or liquid and made out of the same or a different food product than said outer shell, said outer shell comprising at least top and bottom faces with embossings and/or engravings.

Preferably, at least the outer shell of said food product is made out of chocolate.

As can be understood, the present invention brings many advantages compared to the systems known in the art. For example, the food—eg. confectionery—product shape that is achieved is well defined and of a much higher quality than that produced by Erikson rollers.

Moreover, there is no loss of product during the manufacturing process, compared to processes using for instance a curtain of food product. In the latter processes, there is a need for recycling the amount of product in excess, which renders the process and machines more complex and therefore more expensive.

On top of this, the present invention makes it particularly easy to change the shape of embossings since it only requires to replace the punches disposed in the machine.

Finally, the present invention is directed towards a process for manufacturing a food product with an apparatus as described above, which comprises the steps of, in order:
(i) disposing a first drop of molten food product in the open chilled mould,
(ii) moving downward the lower plunger of the mould to create a shell of said food product,
(iii) optionally disposing a food filling into the shell of food product,
(iv) optionally disposing a second drop of molten food product in the open chilled mould,
(v) moving downward the upper plunger so as to close the mould and maintain a compression force to create embossings at the top and bottom sides of the food product thus created,
(vi) moving the pair of upper and lower plungers outside of the matrix plane, and eject the food product.

Additional features and advantages of the present invention are described in, and will be apparent from, the description of the presently preferred embodiment which is set out below with reference to the drawings in which.

Figure 1:
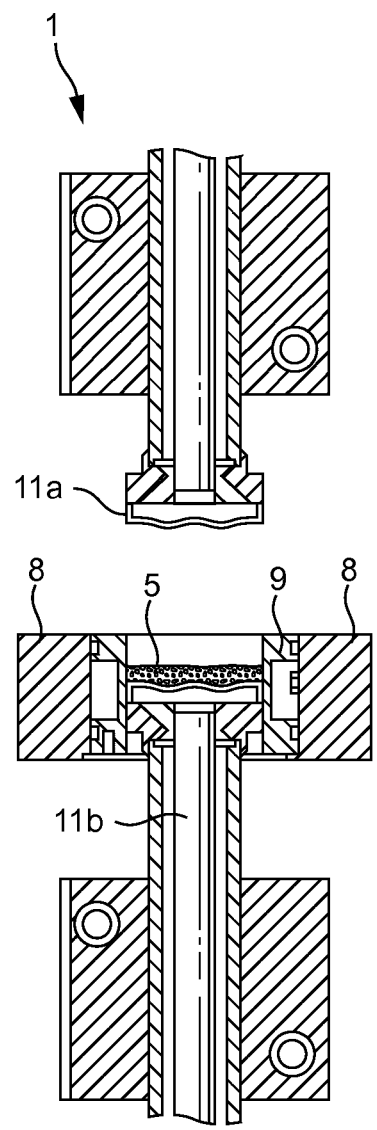
FIGS. 1 to 7 are schematic perspective views of an apparatus according to the invention, each showing a different step of the making process.

The present invention, as shown in the drawings, concerns an apparatus 1 for making a confectionery product 2. The said product has a solid outer chocolate shell 3 with top 4, bottom 5 and side 6 walls, and an inner core 7 filled with semi-solid filling.

According to the invention and as shown in FIGS. 1 to 7, the apparatus 1 comprises:
a support frame 8 holding at least one matrix 9 that goes through said support frame 8 and has opposed openings, this matrix having built-in channels 10 for circulating a chilling fluid for chilling said matrix,
upper 11a and lower 11b punches disposed respectively each side of said matrix 9 and facing said openings, said punches being cylindrical and having a diameter that corresponds to the diameter of said openings, and being movable vertically along a common axis that corresponds to the longitudinal axis of said matrix, said matrix and said pair of punches defining respectively the side and the end walls of a mould 12,
filling means for filling the mould 12 with a predetermined quantity of confectionery product in a liquid or semi-solid form,
actuating means for moving said punches 11a, 11b and exerting a longitudinal pressure onto said punches when said mould 12 is filled with confectionery product and closed so that said product contained into said mould is compressed,
ejecting means for ejecting a moulded confectionery product 2 out of the mould 12 once the latter is in the open position.

The punches—or plungers—11a, 11b comprise a working surface that is embossed, with for instance a logo, or similar drawing or information, that is to be embossed in symmetry onto the upper and lower sides of the end product 2.

The plungers embossings can be made onto a removable portion of the said plungers, so as to ease the change of embossing in the manufacturing line.

Figure 8:
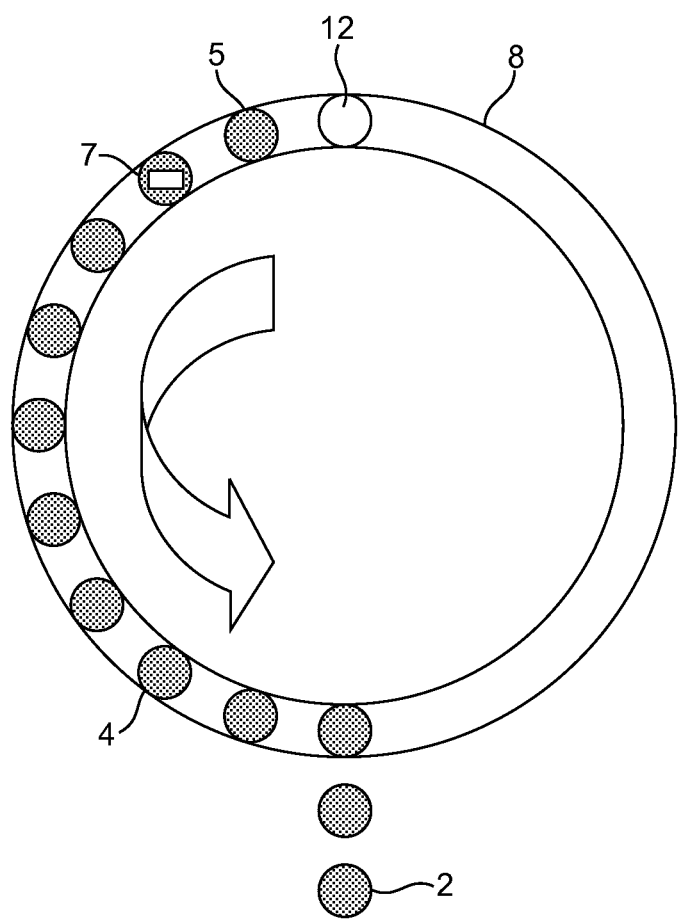
FIG. 8 is a schematic perspective view of a rotary turret showing the different consecutive steps of the manufacturing process of a chocolate according to the invention.

As shown in FIG. 8, the support frame 8 is a horizontal rotary turret with the plurality of moulds 12 disposed at the periphery of said turret, each mould having its punches disposed along a substantially vertical axis.

In this case of a rotary execution the filling means could be by a further, adjacent rotary turret running in time with and above the primary turret, with distribution means for the food product.

The apparatus according to the present invention is operated automatically, and functions as described in the following.

During all the manufacturing steps as described hereafter, the matrix 9 as well as the two plungers 11a, 11b are refrigerated at a temperature comprised between $-20°$ C. and $10°$ C., preferably at a temperature of about $4°$.

The refrigerating/chilling means are not shown in the drawings but comprise a pipe system in the body of the matrix passing through the channels 10, and in the body of the plungers, wherein a refrigerated fluid circulates in closed circuit to and from a refrigerating unit that is located remote from the rest of the apparatus 1.

As shown in FIG. 1, the manufacturing process of the said product with an apparatus according to the present invention starts when the apparatus is in the open configuration. At this stage, the upper plunger is in a location distant from the matrix. In the open side of the matrix, filling means are disposed—not shown on the drawing—which allow to fill the mould with a predetermined quantity of, for instance, molten chocolate.

By mould it is meant the hollow print delimited by the matrix and at least one plunger that is at least partially inserted into said matrix.

Figure 2:
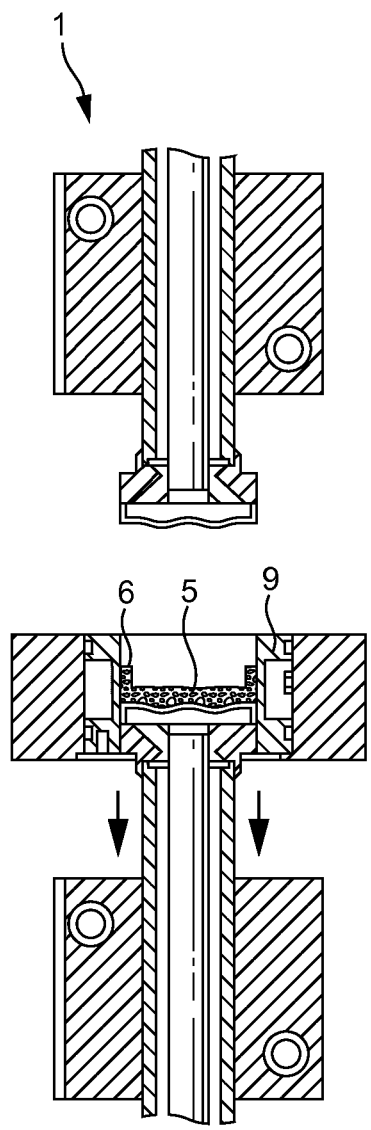

As shown in FIG. 2, once the first drop of molten product, ideally a fat based product, preferably chocolate is disposed into the open mould, the lower plunger is pulled downwards but not so as to open the mould completely. The downward movement of the lower plunger allows the product that is therefore in an almost liquid state, to start to solidify along the chilled side walls of the mould, and so that a cup form of solid product is created.

Figure 3:
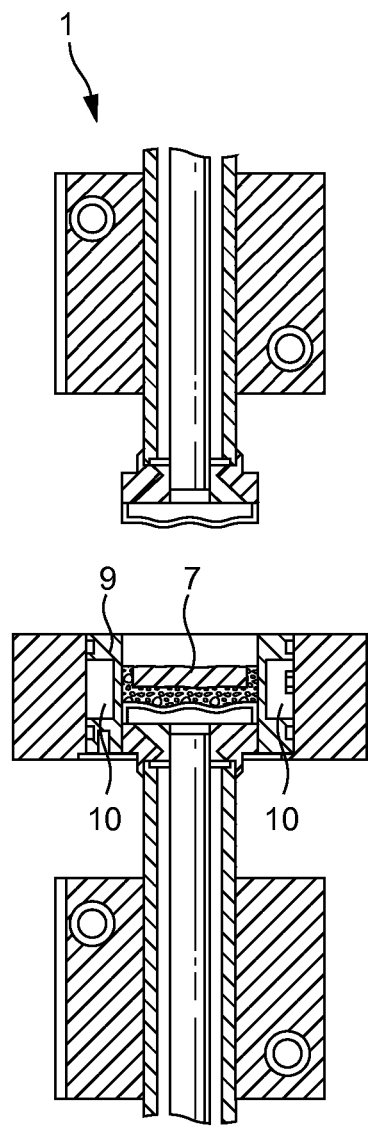

Now turning to FIG. 3, a drop of filling is made, that is disposed inside the solid chocolate shell previously made. During this step, the plungers remain in the same position.

Figure 4:
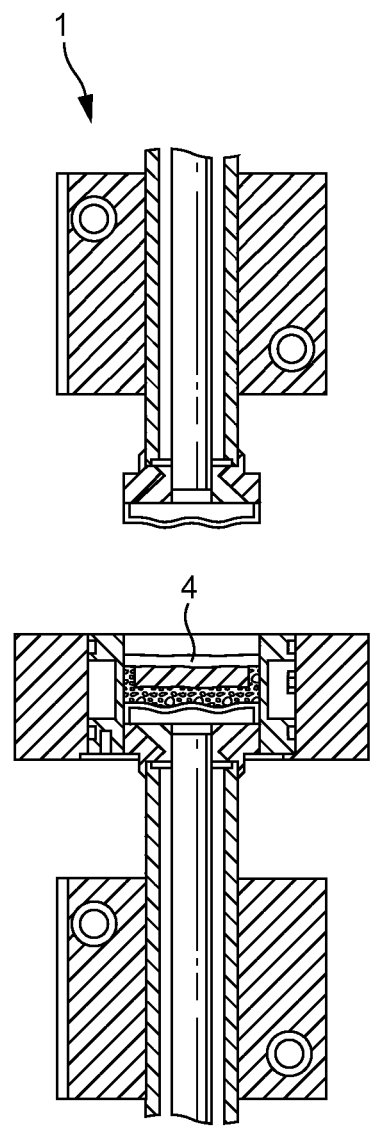

As shown in FIG. 4, a second drop of hot chocolate is then disposed on top of the existing filled solid chocolate shell, so that the whole surface of the shell is covered.

Figure 5:
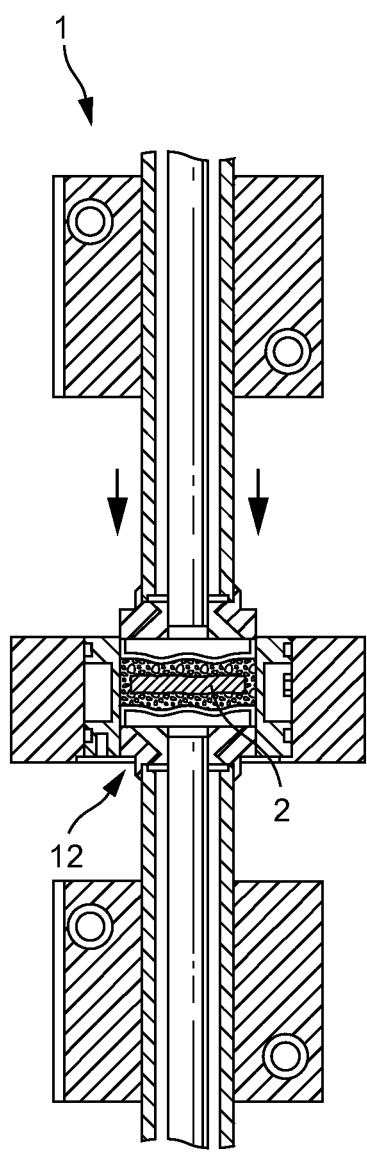

As illustrated in FIG. 5, the upper plunger is then moved downwards so as to close the mould and compress the filled chocolate shell so as to create embossings on top and bottom sides of the end product. In contact with the chilled surfaces of the mould—i.e. matrix and plungers—the chocolate that covers the filled shell previously made starts to solidify. Furthermore, due to the flexibility of the not-so-cold chocolate of the shell that is now filled and closed, the printing of embossings under pressure is still possible.

Figure 6:
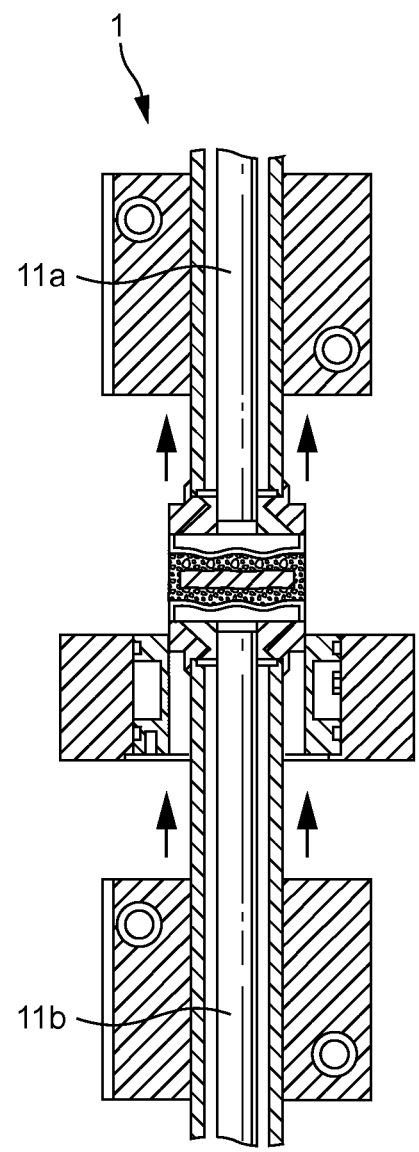

As illustrated in FIG. 6, the pair of plungers is moved upwards from the matrix. During this step, the distance between the upper and lower plungers is maintained as a constant.

Figure 7:
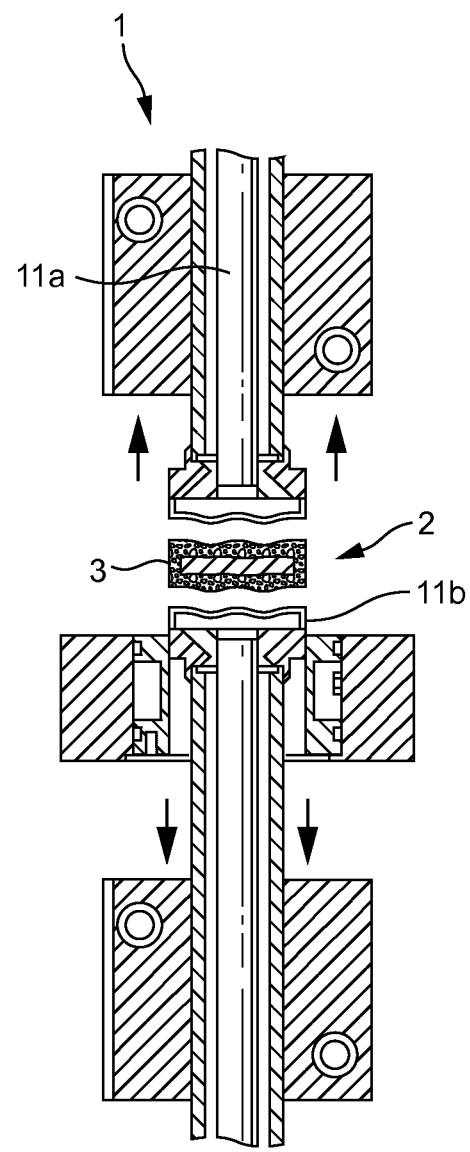

Finally, as illustrated in FIG. 7, the upper and lower plungers move away from one another so that the finished filled and embossed chocolate can be ejected from the apparatus and directed to the next process.

As shown in FIG. 8, the apparatus comprises a rotary frame wherein a series of moulds are disposed, each mould comprising its matrix and pair of plungers. The plurality of moulds is such that the different manufacturing steps described above can be performed as a continuous process around the rotary plate, as it rotates. (This is not a limiting feature as the number of matrix can also be arranged in a linear pattern)

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims. For instance, the filling which was described as "liquid, semi-solid or solid" above, could also comprise aerated types of food products, or gellified products.

The invention claimed is:

1. An apparatus for making a food product, the product having a solid outer shell with top, bottom and side walls, the apparatus comprising:
   a support frame holding at least one matrix that goes through the support frame and has opposed openings that form a bore, the matrix including channels encircling the bore and configured to circulate fluid through the matrix, thereby chilling the matrix;
   two punches disposed respectively on each side of the matrix and facing the openings, the punches having a cross section that corresponds to the cross section of the openings, and being movable along a common axis that corresponds to the longitudinal axis of the matrix, the matrix and the pair of punches defining respectively side and end walls of a mould;
   filling means for filling the mould that dispenses a predetermined quantity of confectionery product in a liquid or semi-solid form, the filling means configured to deposit a first portion of the confectionery product and then a second portion of the confectionery product, all in the same said bore;
   actuating means for moving the punches and exerting a longitudinal pressure onto the punches when the mould is filled with food product and closed, so that the food product contained in the mould is compressed; and
   ejecting means for ejecting a moulded food product out of the mould when the mould is in the open position.

2. An apparatus according to claim 1, wherein the food product comprises an inner core filled with a filling selected from the group consisting of a liquid, semi-solid and solid filling, and the filling means is configured to deposit the first portion of the confectionery product, then the filling, and then the second portion of the confectionery product, all in the same said bore.

3. An apparatus according to claim 1, wherein the predetermined quantity of confectionery product is a chocolate product.

4. An apparatus according to claim 1, wherein the support frame is a horizontal rotary turret with a plurality of moulds located at a periphery of the turret, each mould having its punches located along a substantially vertical axis.

5. An apparatus for making a food product, the apparatus comprising:
   a support frame holding at least one matrix that has opposed openings that form a bore, the matrix having a closed circuit of channels embedded within the matrix for circulating fluid, thereby chilling the matrix;
   two punches located on each side of the matrix and facing the openings, the punches having a cross section that corresponds to the cross section of the openings, and being movable along a common axis that corresponds to the longitudinal axis of the matrix, the matrix and the pair of punches defining the side and end walls of a mould;
   a filler for filling the mould that dispenses a predetermined quantity of confectionery product in a liquid or semi-solid form, the filler configured to deposit a first portion of the confectionery product and then a second portion of the confectionery product, all in the same said bore;
   an actuator for moving the punches and exerting a longitudinal pressure onto the punches with the mould is filled with food product and closed, so that the food product contained into the mould is compressed; and
   an ejector for ejecting a moulded food product out of the mould.

6. An apparatus according to claim 1 comprising:
   a refrigerating unit that circulates the fluid to and from the channels in a closed circuit.

7. An apparatus according to claim 1, wherein at least one of the pair of punches comprises a working surface embossed with indicia.

8. An apparatus according to claim 7, wherein the at least one of the pair of punches comprises a portion that is reversibly removable, the reversibly removable portion comprising a working surface embossed with indicia.

* * * * *